United States Patent [19]

Rice

[11] 4,012,972
[45] Mar. 22, 1977

[54] BAND APPLYING APPARATUS

[75] Inventor: Harold B. Rice, Walnut Creek, Calif.

[73] Assignee: John Burton Machine Corporation, Rodeo, Calif.

[22] Filed: May 30, 1975

[21] Appl. No.: 582,379

[52] U.S. Cl. .............................. 82/70.2; 53/291; 82/91; 82/102

[51] Int. Cl.² ...................... B23B 3/04; B23B 5/14; B65B 7/28

[58] Field of Search ............... 53/291; 82/46, 70.2, 82/71, 72, 73, 74, 75, 76, 77, 91, 101, 102

[56] References Cited
UNITED STATES PATENTS

| 2,586,424 | 2/1952 | Gazette | 82/91 |
|---|---|---|---|
| 2,623,673 | 12/1952 | Holstein | 53/291 |
| 2,765,607 | 10/1956 | Aquilar et al. | 53/291 |
| 2,846,835 | 8/1958 | Aquilar et al. | 53/291 |
| 2,860,468 | 11/1958 | Aquilar et al. | 53/291 |

Primary Examiner—Harrison L. Hinson
Attorney, Agent, or Firm—Gordon Wood

[57] ABSTRACT

A banding machine for feeding sleeves of banding material onto bottle necks and the like when the sleeves are of tough material requiring use of a sharp cutting edge. The mandrel along which the tubular banding material is fed is formed to provide a radially outwardly opening groove at which the cutter cuts the material. The groove is closed when the mandrel and material are moved relatively.

11 Claims, 5 Drawing Figures

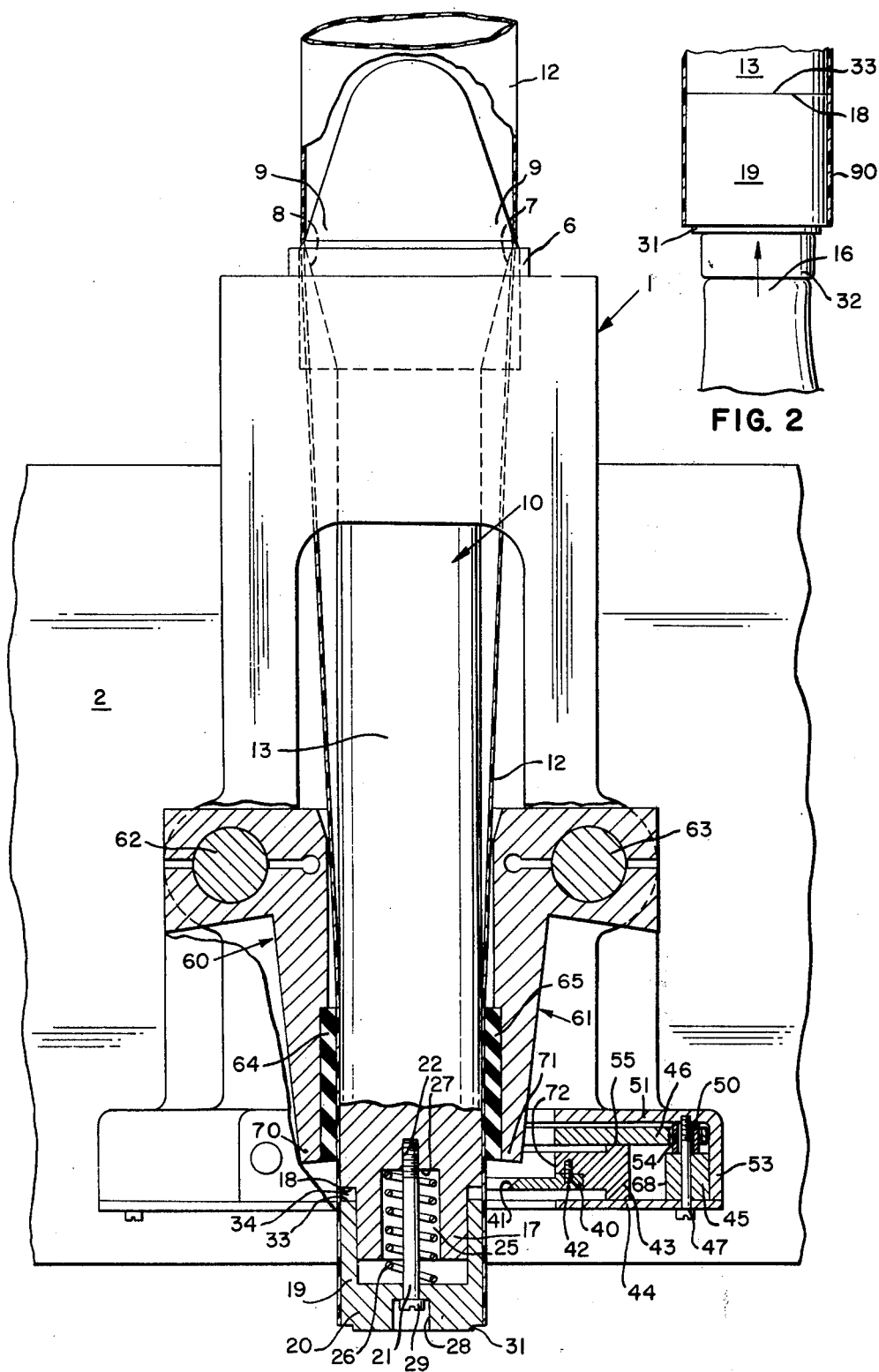

BAND APPLYING APPARATUS

This invention relates to a device for feeding and cutting elongated lengths of tubular material. More particularly, the invention is concerned with an apparatus for applying tubular bands or sleeves to the necks of bottles for sealing the cap or cork of such bottles. The invention is, in many respects, similar in operation to the devices disclosed in U.S. Pat. Nos. 2,765,607 dated Oct. 9, 1956; 2,846,835 dated Aug. 12, 1958; and 2,860,468 dated Nov. 18, 1958.

The methods and apparatus disclosed in the above cited patents have been successfully employed for applying sealing bands around the necks of whiskey bottles and the like. Also, they have been employed in numerous other applications wherein it is necessary to encircle a generally cylindrical article with a sleeve formed of material that is adapted to shrink upon drying. Obviously, these inventions have numerous other applications in the packaging industry, all of which applications are contemplated by the present invention.

The material which heretofore has been normally used to make the flattened tubular ribbons from which the bands are cut has been relatively thick and has been characterized by the ease with which it could be broken or cut. Actually, the cutting operation shown in FIGS. 7 and 8 of U.S. Pat. No. 2,860,468 has not been a true cutting operation in that it has not been necessary to employ a sharpened cutting edge since mere pressure by a dull edge has been sufficient to separate the material to form bands. In other words, the operation of cutting the bands has heretofore been really a combination of cutting and separating by pressure. It is for this reason that it has been possible to employ an air driven rotor carrying a relatively dull cutting edge of the type shown in U.S. Pat. No. 3,097,554. If a sharp cutting edge were employed on the cutter 17 of U.S. Pat. No. 3,097,554, such edge would be dulled after a short period of use because of its engagement with the hard surface of the mandrel 25 on which the cutting operation is performed. However, since a sharp cutting edge has not been required, the high speed rotation of the rotor as shown in U.S. Pat. No. 3,097,554 has permitted adequate separation of the tubular material into bands without any problems arising.

It has now been proposed to substitute a relatively thin walled tubular material for that heretofore employed. Such new material is only a few thousandths thick and is extremely tough so that it does not lend itself to separation except by cutting with a sharp edge.

It is, therefore, the main object of the present invention to adapt the banding machines shown in U.S. Pat. Nos. 2,846,835 and 2,860,468 to the operations of feeding and cutting a material that is extremely tough and relatively thin.

Another object of the invention is the provision of a novel apparatus for feeding and cutting tubular material by means of an air driven motor thus permitting the cutting operation to be done at an extremely high speed and also permitting the entire banding operation to be speeded up.

Still another object of the invention is the provision of a novel mandrel structure which lends itself to use with relatively tough thin walled tubular material which has an extremely different behavior from the relatively soft thick walled material heretofore used.

Another object of the invention is the provision of an improved method of feeding thin walled tubular material such as may be employed for encircling articles such as bottles, flashlight batteries and containers of other types.

Other objects and advantages of the invention will be apparent from the following specification and from the drawings.

FIG. 1 is a front elevation of the invention partly broken away and in section to show internal structure.

FIG. 2 is a side elevation of the lower portion of the mandrel of FIG. 1 showing an article such as a bottle holding the mandrel in a raised position.

Figure 3:
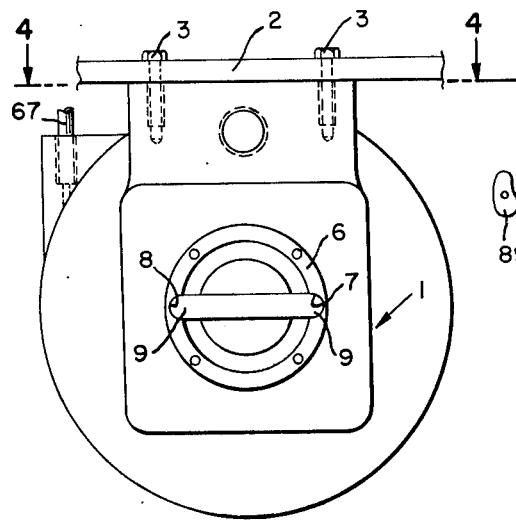
FIG. 3 is a top plan view of the structure of FIG. 1.

The invention comprises a housing generally designated 1 which is secured to a vertically extending plate 2 which in turn may be a sidewall of a speed compensating head such as head 30 of U.S. Pat. No. 2,860,468. Reference is made to U.S. Pat. No. 2,860,468 for details in operation of the invention not disclosed herein. For purposes of this disclosure it may be assumed that plate 2 undergoes a generally orbital movement in a vertical plane and during the lower portion of its swing its speed of translation in a horizontal direction is uniform and may be made equal to the speed of translation of the bottles or other articles with which the device to be described is adaped to cooperate. It may therefore be assumed in this connection that the instant invention is being employed to apply bands to the necks of bottles such as indicated at 3 in FIG. 1 of U.S. Pat. No. 2,860,468. For the purpose of securing the housing 1 to the moving plate 2 bolts 3 (FIG. 3) may be employed.

Figure 4:
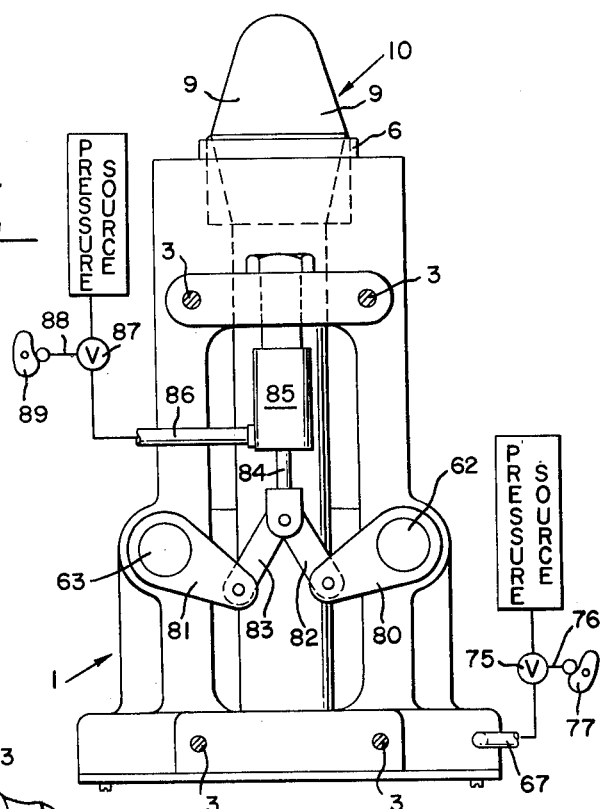
FIG. 4 is a rear elevation of the structure of FIG. 1 and is taken in a plane indicated by lines 4—4 of FIG. 3.

As in the reference U.S. Pat. No. 2,860,468, the top of the housing 1 is provided with a bushing 6 formed with recesses 7, 8 to receive therein the flattened wing portions 9 of the top end of the mandrel generally designated 10. Althouh the specific structure of the mandrel 10 of the present invention is different from that shown in the reference patent, the upper portion of the mandrel is substantially similar in both devices. The function of the bushing 6 is to hold the mandrel 10 suspended therefrom in the lowermost position of the mandrel relative to the housing 1 and at the same time permit upward movement of the mandrel during the band feeding operation of the tubular material. It will be understood that the flexible band or tubular member 12 surrounds the madrel 10 and, although the mandrel 10 is supported at its upper end on housing 1 as seen in FIG. 4, the sidewalls of the tubular member 12 are interposed between the mandrel and the bushing 6. The major cylindrical central portion 13 of the mandrel 10 functions to conform the tubular banding material to the cylindrical shape of the mandrel so that when the tubular band is discharged from the lower end of the mandrel it is of the proper cylindrical shape to encircle the article such as the bottle neck 16 (FIG. 2).

Adjacent the lower end of mandrel 10 the same is reduced in diameter to provide a tail portion 17 and a downwardly directed annular shoulder 18. Slidably received on the cylindrical tail portion 17 is a sleeve 19 which is provided with an integral bottom wall 20 which is centrally apertured to slidably receive therethrough a vertically extending bolt 21 which is screwthreadedly received at its upper end in a tapped hole 22 formed in the cylindrical body portion 13 of mandrel 10. The mandrel is provided with a central downwardly opening recess 25 for receiving therein a compression spring 26 extending between the bottom wall 20 of sleeve 19 and the inner end 27 of recess 25. The bottom wall 20 of sleeve 19 is provided with a relatively deep hole 28 so as to permit upward movement of the sleeve 19 without the bolt head 29 emerging from the hole 28. Preferably the bottom wall 20 is provided with a reduced diameter annular portion 31 that is adapted to engage the closure 32 of the bottle neck 16 (FIG. 2).

At this point it will be apparent that the upper annular shoulder 33 formed by the upper end of sleeve 19 is normally spaced downwardly by the urgency of spring 26 from the shoulder 18 above referred to thereby providing a radially outwardly opening annular groove 34. When the closure 32 of the bottle neck 16 urges the sleeve 19 upwardly to the position of FIG. 2, it will be apparent that the groove 34 closes so as not to offer any impediment to the downward movement of the tubular member 12. In this connection it will be understood that the tubular member 12 is of extremely thin material and, by the present invention, must be made to hug the cylindrical portion 13 of the mandrel 10 very closely so as to permit the cutting operation to be carried out as will subsequently be described.

The means for cutting the tubular member 12 is an air driven cutter similar to that disclosed in FIGS. 1 and 2 of U.S. Pat. No. 3,097,554. As best seen in FIG. 1, an annular cutter 40 is provided having a circular radially inwardly directed cutting edge 41 which is adapted to partially enter the groove 34 in mandrel 10 during the cutting operation. The cutter blade 40 is secured by means of screws 42 to a rotor 43 which is floatingly mounted within a casing comprising a bottom wall 44, peripheral wall 45 and upper wall 46. As best seen in FIG. 1, the peripheral wall 45 and the bottom wall 44 may be secured to housing 1 by means of a circular row of bolts 47. In most respects the air motor disclosed herein is the same as that shown in FIGS. 1 and 2 of U.S. Pat. No. 3,097,554 except in this case the upper wall 46 is shiftable upwardly under the pressure of the air in the circumferentially extending passageway existing between the rotor 43 and the peripheral wall 45. To this end bushings 50 are interposed between the peripheral wall 45 and the downwardly facing wall 51 formed in housing 1 (FIG. 1). In this connection it will be seen that the air motor may be fitted within the cylindrical space defined by the inner wall 51 and the generally cylindrical skirt portion 53 that is integral with housing 1. Bushings 50 surround bolts 47 thus spacing the top of peripheral wall 45 of the motor from the downwardly facing wall 51 of the housing and the top wall 46 of the air motor is provided with holes 54 for loosely receiving bushings 50 therethrough. By this structure it will be apparent that the top wall 46 of the air motor may be urged upwardly by the air pressure when the motor is in operation and, after the air pressure has been removed, the top wall 46 falls downwardly by gravity into engagement with the upper annular face 55 of the rotor 43. By this structure the rotor 43 and therefore the cutter 40 is prevented from shifting due to inertial effects brought about by the orbital movement of the plate 2 to which the housing 1 is secured.

At this point it will be noted that it is important to center the rotor 43 relative to the vertical central axis of the mandrel 10 so that the cutting edge 41 does not interfere with downward movement of the tubular member 12 during the feeding operation of the latter. The method by which the rotor 43 is centered will be described later on but it will be noted at this point that once the rotor is centered the top wall 46 holds it in its centered position by the weight of said top wall.

In general, the feeding operation of the present invention is carried out in somewhat the same manner as disclosed in U.S. Pat. No. 2,860,468 in that a pair of grippers are employed to impart radially inwardly directed forces to the tubular member pressing the same against the mandrel as the latter is moved upwardly by the article to which the band is to be applied. However, in the instant case it is impractical to employ a sliding sleeve against which the grippers are pressed since the tubular member hugs the mandrel too closely to permit this structure. For this reason, by the present invention the grippers are pressed directly against the solid body of the mandrel with the sidewalls of the tubular member interposed therebetween. As best seen in FIG. 1, the grippers generally designated 60, 61 are swingably supported about their upper ends on shafts 62, 63, respectively, which shafts are rotatably secured in housing 1. The grippers 60, 61 extend downwardly from shaft 62, 63 and are provided along their arcuate opposed surfaces with pads 64, 65 of yieldable cushioning material. Said pads engage the adjacent sidewalls of the tubular member 12 and urge the same radially inwardly against the cylindrical outer sidewall of the cylindrical portion 13 of the mandrel 10. The method of operating the grippers 60, 61 will subsequently be described but it will be apparent at this point that if the grippers are in gripping relationship with the tubular member 12 while the mandrel 10 is being urged upwardly as seen in FIG. 2, said grippers will hold the tubular material while the mandrel moves upwardly relative thereto. In this manner the feeding of the tubular material is accomplished.

Before the grippers 60, 61 are released from the tubular member the cutting operation is initiated. This is done by directing air under pressure through flexible tube 67 (FIG. 3) causing the rotor 43 to undergo an orbital movement similar to that described in U.S. Pat. No. 3,097,554. However, in this case it is important to note that the rotor 43 rolls on the radially inwardly directed side 68 of peripheral wall 45 of the air motor. In other words, there is no clearance between the outer periphery of the rotor 43 and the inner periphery of the peripheral wall 45 and in the course of its orbital movement the cutting edge 41 of the cutter 40 extends slightly into the radially outwardly opening groove 34 formed between shoulders 18, 33 (FIG. 1). By this structure it becomes possible to sharpen the cutting edge 41 to form a very keen cutting element without any danger of the cutting edge becoming dulled through contact with a solid surface. The only material engaged by the cutting edge 41 is the tubular banding material to be cut. At this point the significance of the tight fit between the tubular member 12 and the mandrel 10 will be apparent. If the tubular material were slack across the recess 34, there would be a tendency for it to deflect inwardly of the recess 34. Since the tubular member 12 is stretched tightly across the groove 34 the cutting of the tubular material becomes that much more simplified.

As best seen in FIG. 1, the lower ends 70, 71 of the grippers 60, 61, respectively, are adapted to engage the radially inwardly directed surface 72 of rotor 43 as the grippers are swung away from their gripping position relative to the mandrel 10. Since the outward movement of grippers 60, 61 occurs just before the mandrel moves downwardly from its elevated position, it will be seen that there is no danger of the mandrel or the tubular member surrounding it engaging the cutting edge 41. If such engagement were permitted it would interfere with the return of the mandrel to its lower position.

From the above described structure it will be apparent that the rotor 43 is held in its concentric position relative to the vertical axis of mandrel 10 until the grippers 60, 61 move toward each other for holding the tubular member prior to the cutting operation.

It will be understood that the actuation of the air motor driving rotor 43 and the actuation of the grippers 60, 61 are carried out in timed relationship to the various other functions of the machine disclosed in U.S. Pat. No. 2,860,468. Although said patent may be referred to for supplying details not disclosed herein, a semischematic diagram showing the operation of the air motor and the grippers is included in FIG. 4. The flexible tube 67 is connected to a valve 75 which is for the purpose of interrupting the flow of air from the pressure source indicated and said valve 75 may be operated by an actuating arm 76 controlled by a cam 77 rotating at the same speed as shafts 131 and 132 of U.S. Pat. No. 2,860,468. In this manner the starting and stopping of the air motor may be timed with relation to the other operations so that the cutter is actuated while the tubular member 12 is held by the grippers 60, 61.

As best seen in FIG. 4, actuating arms 80, 81 are connected to the shafts 62, 63 to which the grippers 60, 61 are secured. The arms 80, 81 are in turn connected by links 82, 83 to the plunger 84 of an air cylinder 85 to which is connected flexible hose 86. The cylinder 85 has a spring return (not shown) so that on the power stroke of the cylinder under pressure of air from tube 86 the grippers are brought into gripping relationship with the tubular member 12 and the mandrel 10. Upon disconnection of the air under pressure, the cylinder spring returns the grippers to their outer position in which position they serve to center the rotor 43.

The air supply hose 86 may be connected through a valve 87 to a source of pressure as indicated and valve 87 may be actuated by actuating rod 88 from cam 89 which rotates at the same speed as shafts 131, 132 of U.S. Pat. No. 2,860,468.

At this point a brief description of the closely timed operations may be given: As the mandrel 10 approaches the closure 32 of the article to be banded the tubular member 12 has already been cut by cutting edge 41 of rotor 43 to provide a band 90 (FIG. 2). As the article raises the sleeve 19, the groove 34 is closed before any feeding of the tubular member takes place. This closing of the groove 34 is extremely important since the tubular member hugs the mandrel very tightly and if the groove 34 were to remain, the tubular member would tend to enter the groove and curl up thereby preventing correct feeding. When shoulders 18, 33 engage, further upward movement of the mandrel feeds the cut band 90 onto the article 16 since the tubular member 12 is held by grippers 60, 61 and the remainder of the tubular member 12 urges the cut band 90 off the sleeve 19. After the plate 2 has been moved to a point where the mandrel is permitted to fall downwardly, the grippers 60, 61 are disengaged so that the mandrel and the tubular member 12 move downwardly as a unit with the cut edge of the tubular member 12 adjacent the lower end of sleeve 19 of the mandrel 10.

During the remaining orbital movement of the plate 2 before it again reaches the next article to be banded, the operations of gripping the mandrel and cutting the same are carried out as above described so that the next cut band is ready for application on the next article.

It will be apparent that the provision of the groove 34 is extremely important in ensuring that the cutting edge 41 retains its keenness since said cutting edge does not come in contact with anything except the tubular member 12. Also it will be noted that the closing of groove 34 is necessary to obtain unencumbered feeding of the tubular member 12. It will also be noted that the top wall 46 of the air motor functions to hold the rotor 43 in its concentric position relative to the vertical axis of the mandrel during the orbital movement of plate 2. Because of the inertial effects of said orbital movement the freely floating rotor 43 might otherwise be shifted into a nonconcentric position in which it would interfere with the return of the mandrel by gravity to its lowermost position shown in FIG. 1.

Figure 5:
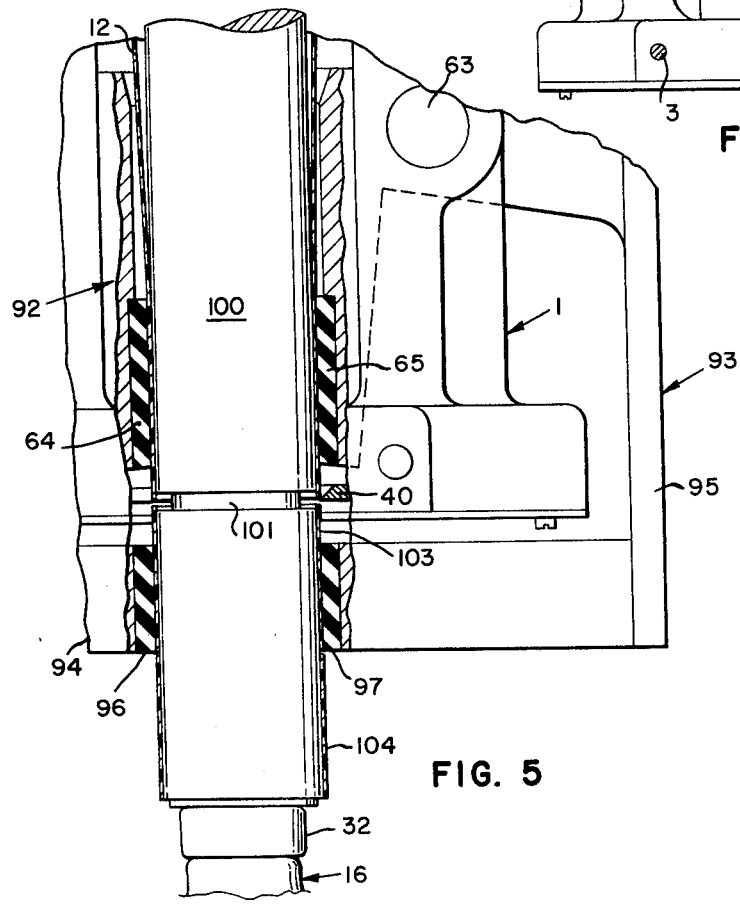
FIG. 5 is a fragmentary side elevation of a modified form of the invention.

In some applications it is desirable to grip the mandrel at points above and below the cutter 40 in order to ensure the tightness of the tubular member across the radially outwardly opening groove 34. For example, if the tubular member 12 is made of extremely thin membrane-like material the inward pressure of the cutting edge 41 might tend to pull the lower end of the tubular member 12 into the groove 34 so that adequate cutting action cannot be achieved. In such an instance a modified form such as shown in FIG. 5 may be employed. In this case a pair of grippers generally designated 92, 93 are carried by shafts 62, 63. Said grippers 92, 93 are similar to grippers 60, 61 of FIG. 1 in that they are provided with upper pads 64, 65 for engaging the tubular member 12 at points above the cutter 40. However, the grippers 92, 93 of FIG. 5 are provided with downwardly extending extension arms 94, 95 which are formed to clear the housing 1 and which are provided at their lower ends with gripper pads 96, 97. At this point it will be seen that the upper and lower pairs of gripper pads 64, 65 and 96, 97 function to grip the tubular member 12 both above and below the cutter 40 as the latter is rotated to cut the member 12.

With the structure of FIG. 5 the mandrel 100 is provided with a peripherally extending groove 101 which cooperates with cutter 40 to permit the latter to cut the tubular member 12. However, in this case it is not necessary to close groove 101 to permit feeding the tubular member. The reason for this is that since the lower gripper pads 96, 97 function to positively feed the tubular member 12 it is not necessary for the upper main portion of member 12 to feed the cut band ahead of it. Therefore the thin walled material is not in compression and does not tend to curl into the cutting groove as is the case with the structure of FIG. 1.

The structure of FIG. 5 requires that the length of the mandrel 100 between the groove 101 and the lower end of the mandrel be equal to about the length of two cut bands. In this manner the lower gripping pads 96, 97 engage the upper cut band 103 which in turn pushes ahead of it the previously cut band 104 during the feeding step.

The very specific description given above of the preferred forms of the invention should not be taken as restrictive as it will be apparent that various modifications in design may be resorted to by those skilled in the art without departing from the scope of the following claims.

I claim:

1. In a device for cutting bands from one end of an elongated length of tubular material,
   a housing,
   an elongated cylindrical mandrel supported in said housing and adapted to be received within said material,
   a casing carried by said housing,
   a rotor supported for orbital movement within said casing and provided with a circular radially inwardly directed cutting edge in surrounding relationship to said mandrel for cutting said material,
   said casing being provided with an end wall in a plane at right angles to the axis of said mandrel and extending across the upper side of said rotor,
   said end wall being free for movement by gravity into engagement with the upper side of said rotor to prevent shifting of the latter.

2. A device according to claim 1 wherein gripping fingers are employed to feed said material longitudinally of said mandrel, said fingers being adapted to engage said rotor when moved out of gripping relationship with said member for centering said rotor relative to the axis of said mandrel.

3. In a device for longitudinally feeding an elongated tubular member and cutting bands from one end of said member,
   a housing,
   an elongated mandrel vertically disposed in said housing and adapted to be axially received within said member,
   a casing,
   a rotor mounted in said casing and provided with a circular radially inwardly directed cutting edge surrounding said mandrel,
   a pair of opposed fingers mounted in said housing for movement toward each other into gripping relation with said member for feeding said member upon relative movement of said mandrel and housing,
   said fingers being adapted to engage said rotor at their corresponding ends for centering the latter relative to said mandrel when said fingers are out of gripping relation with said member.

4. A device according to claim 3 wherein said mandrel includes a pair of relatively movable annular shoulders defining a radially outwardly opening groove, and means for moving said shoulders toward each other for closing said groove when said member is fed relative to said mandrel.

5. In a device for longitudinally feeding an elongated tubular member and cutting bands from one end of said member,
   a housing,
   an elongated mandrel vertically disposed in said housing and adpated to be axially received within said member,
   a casing,
   a rotor mounted in said casing and provided with a circular radially inwardly directed cutting edge surrounding said mandrel,
   said casing including an upper sidewall supported for movement by gravity into engagement with said rotor for holding said rotor against shifting relative to said casing when said rotor is inoperative.

6. In a device for longitudinally feeding an elongated tubular member and cutting bands from one end of said member,
   a housing,
   an elongated mandrel vertically disposed in said housing and adapted to be axially received within said member,
   a casing,
   a rotor mounted in said casing and provided with a circular radially inwardly directed cutting edge surrounding said mandrel,
   pairs of upper and lower gripping elements respectively above and below said cutting edge for gripping said member during cutting of said member.

7. A device according to claim 6 wherein said gripping elements are in engagement with said mandrel during relative movement of said mandrel and said member for feeding said member along said mandrel.

8. Apparatus for feeding a length of flexible tubular material downwardly along a vertical path of travel toward an article such as a bottle neck and for cutting said length into bands comprising:
   a housing,
   an axially elongated mandrel verically supported in said housing and adapted to be received within said tubular material for expanding the sidewalls of said material to tubular shape,
   a sleeve slidably supported on said mandrel for axial movement relative thereto,
   opposed annular shoulders on said mandrel and sleeve respectively, said shoulders adapted to be separated when said sleeve and mandrel are moved relatively in one direction to form a radially outwardly opening groove, and adapted to be abutted to close said groove when said mandrel and sleeve are moved relatively in the opposite direction by such article, and
   a cutter having an annular cutting edge surrounding said mandrel for cutting said material at said annular groove.

9. Apparatus according to claim 8 wherein spring means is employed to urge said mandrel and sleeve in said one direction at all times.

10. A device according to claim 8 wherein said material is fed axially of said mandrel by gripping means in said housing exerting radially inwardly directed forces against said mandrel with the sidewalls of said material between said mandrel and said gripping means.

11. A device according to claim 10 wherein gripping means engages said cutter for centering the same relative to the axis of said mandrel after said cutter has cut said material.

* * * * *